Nov. 6, 1951  J. NELSON  2,574,347
DRILLING UNIT
Filed April 17, 1947  2 SHEETS—SHEET 1
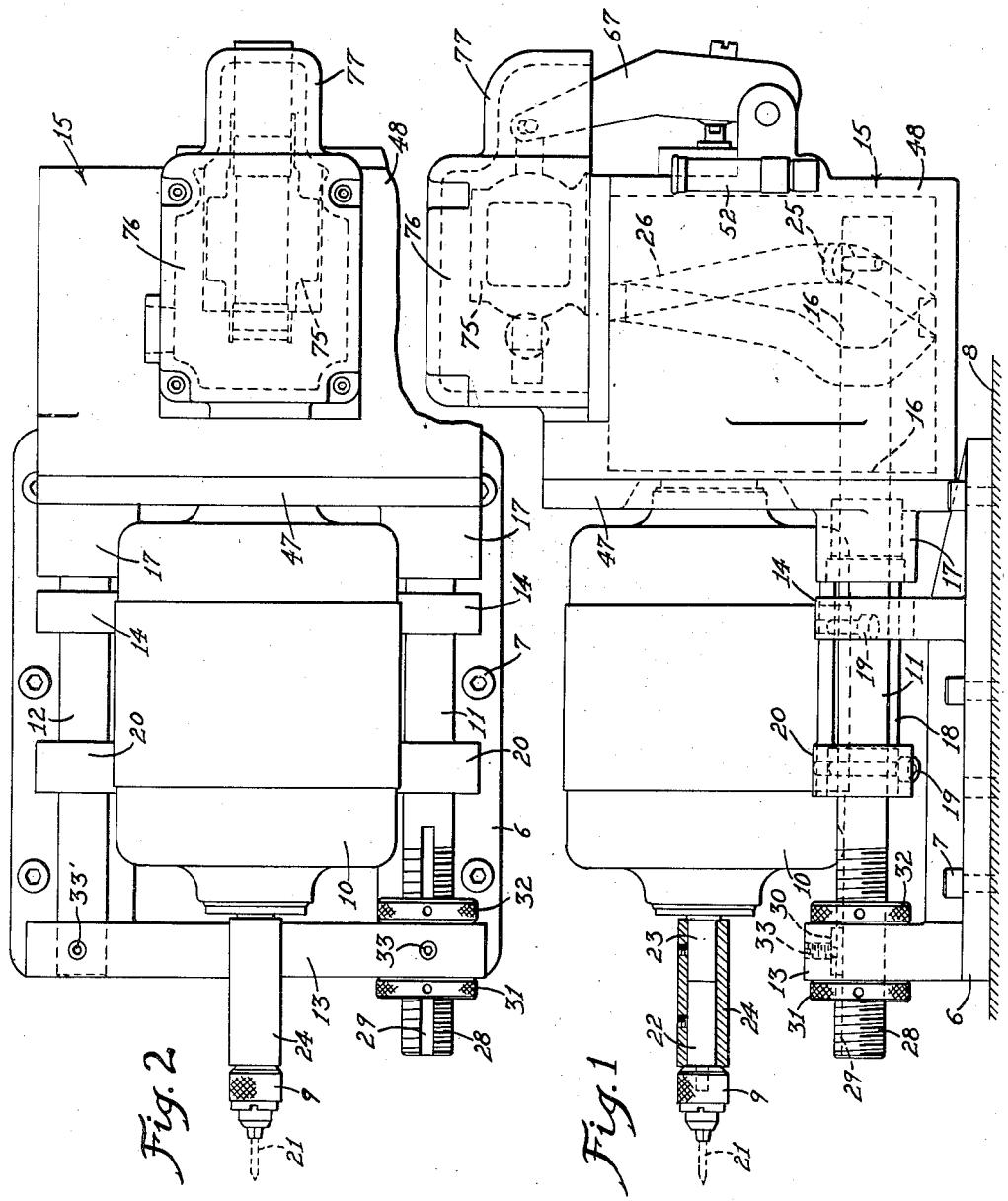
Inventor:
John Nelson
Atty.

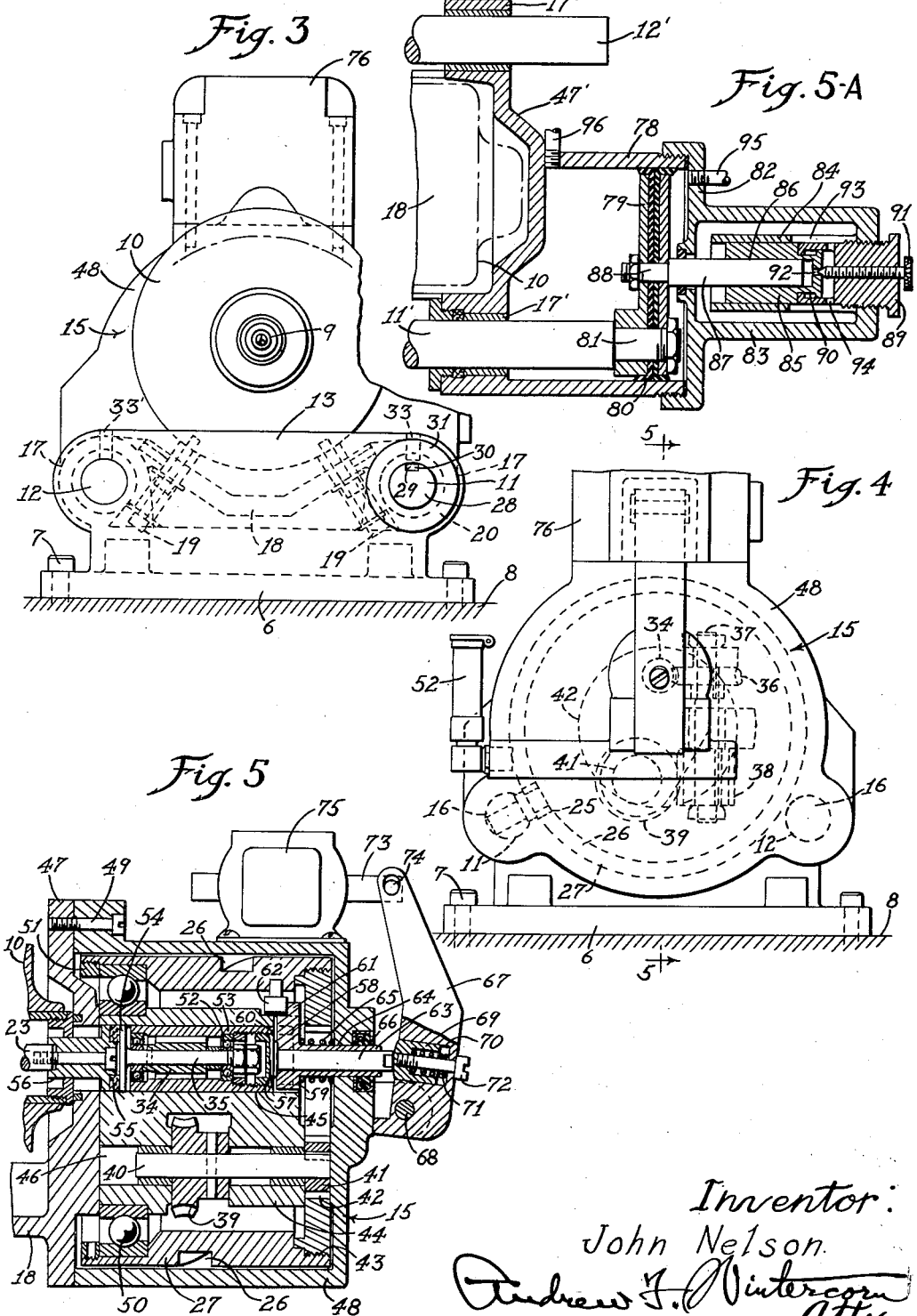

Patented Nov. 6, 1951

2,574,347

UNITED STATES PATENT OFFICE 2,574,347

DRILLING UNIT

John Nelson, Rockford, Ill.

Application April 17, 1947, Serial No. 741,991

5 Claims. (Cl. 77—34.1)

This invention relates to a new and improved high-speed drill unit designed for a wide variety of applications in the machine tool industry, wherever a self-contained unit of the present character may be suitable.

The principal object of my invention is to provide each tool spindle as a direct extension of the armature shaft of its electric drive motor and to provide in conjunction with the motor a simple, compact and economical mechanism for imparting reciprocatory movement to the motor through a cycle of rapid approach, feed and rapid return.

In the machine of my invention, the drill unit includes two laterally spaced parallel guide rods carried on a suitable base having the electric drive motor slidably mounted thereon for reciprocation, the motor housing being in fixed relation to another housing disposed behind the motor on the opposite end from the tool spindle in which a rotatable drum type cam is provided cooperating with a dog on one of the guide rods and arranged to be driven through a power take-off from the rear end of the armature shaft of the electric drive motor to impart endwise movement to the motor. A clutch for connecting and disconnecting the drive for said cam is operable automatically in proper relationship to the reciprocation of the motor in its transverse and feed movements, the clutch being preferably engageable upon energization of a solenoid so as to start the turning of the cam, and the clutch being preferably disengageable automatically by a dog on the cam at the end of the cycle. Screw threaded adjusting means cooperating with that one of the guide rods on which the cam dog is provided predetermines exactly how far forward the motor will travel with the tool spindle in its feed movement, whereby to suit the specific needs of any given job.

The invention is illustrated in the accompanying drawings, in which:

Fig. 1 is a side view of a high speed drill unit, made in accordance with my invention;

Fig. 2 is a plan view thereof;

Figs. 3 and 4 are end views of the unit taken from opposite ends;

Fig. 5 is a longitudinal section in a vertical plane through the cam housing taken on the line 5—5 of Fig. 4, and Fig. 5A is a view similar to Fig. 5, but showing a horizontal section longitudinally through the same portion of another drill unit in which a fluid pressure operable mechanism is employed instead of a rotary cam for imparting feed and traverse movements to the motor.

Similar reference numerals are applied to corresponding parts throughout the views.

Referring first to Figs. 1 to 5, the reference numeral 6 designates the base for the unit which is adapted to be bolted or otherwise suitably secured, as indicated at 7, onto a fixture 8 or onto the frame or other part of a machine, wherever a drill or other tool carried in the chuck 9 and arranged to be driven by the electric drive motor 10 may be used. A pair of parallel guide rods 11 and 12 are mounted horizontally in laterally spaced relation in the upwardly projecting transverse front end portion 13 of the base 6, and in upwardly projecting bosses 14 provided on the rear end portion of the base. A cam housing 15 is slidably mounted on the rearwardly projecting ends 16 of the guide rods by means of its opposed bearings 17 and has a forwardly extending shelf 18, provided preferably as an integral extension of the housing between the bearings, to which the housing of the motor 10 is rigidly secured, as by screws 19. Two opposed bearings 20 for slidably supporting the front end of the shelf 18 on the rods 11 and 12 are preferably fastened to the shelf by the same screws 19 used for fastening the motor housing to the shelf. Thus, it is clear that the motor 10 is slidable endwise on the guide rods 11—12 to give feed and traverse movements to the drill or other tool carried in the chuck 9 and indicated in dotted lines at 21. The chuck 9 carrying the tool 21 is mounted on an arbor 22 which in turn forms a direct spindle extension of the armature shaft 23 of the motor 10, being rigidly connected therewith, as shown at 24. In that way I take advantage of the good high speed bearings provided in the motor housing for the armature shaft, making them serve also to support the high speed tool, and I obtain not only a more compact construction but one which is far more practical and economical. In passing, attention is called to the fact that the rod 11 carries a dog 25 which is preferably in the form of a roller for anti-friction rolling contact in an endless cam-track 26 provided as a groove in the periphery of the cylindrical drum shaped cam 27 that is rotatably mounted on a ball bearing in the housing 15. As will soon appear, the cam 27 is arranged to be driven through one complete revolution per cycle through a power take-off from the armature shaft 23 of the motor, whereby in each such single revolution of the cam to transmit feed and traverse movements to the motor 10 and tool 21 predetermined by the profiling of the cam groove 26. Also, attention is called to the fact that the rod 11, on which the dog 25 is carried, is threaded at its forward end 28 and has a keyway 29 therein cooperating with a key 30 to hold the rod against turning when the adjusting nuts 31—32, that are threaded on the rod on opposite sides of the bearing 13, are adjusted to adjust the dog 25 in a forward or rearward direction, as desired, to predetermine exactly how far forward the tool 21 will travel in its feed movement, as a particular job in question may require. The nuts 31—32 are tightened to lock the rod 11 in adjusted position, and a set screw 33 is provided to hold the key 30 against endwise movement by engagement of its pointed end in a conical recess in the top of the key. The other rod 12 is held against endwise movement by a set screw 33'.

The power take-off for driving the cam 27 from the armature shaft 23 is shown in Figs. 4 and 5 and comprises a worm 34 keyed or otherwise suitably fixed on a driven shaft 35 disposed in coaxial relation to the rear end of the armature shaft 23 and having clutch means for drivingly connecting the same therewith, as will soon appear, the worm 34 meshing with a worm gear 36 keyed or otherwise suitably fixed on the upper end of a vertical shaft 37 that has a worm 38 keyed or otherwise suitably fixed on its lower end meshing with a worm gear 39 pinned or otherwise suitably fixed on a coutershaft 40. The countershaft 40 has a pinion 41 keyed or otherwise suitably fixed on the rear end thereof meshing with an internal ring gear 42 fixed to the cam 27, as indicated at 43. The generally cylindrical block 44, in which parallel bores 45 and 46 are provided for the clutch mechanism associated with shaft 35 and for the bushings for bearing support of shaft 40, is separate from but suitably secured to the front end wall 47 of the housing 15, there being a cup-shaped member 48 to enclose the cam 27, secured to the end wall 47, as at 49. The ball bearing 50 for support of the cam 27 has its inner race ring clamped between the block 44 and end wall 47, its outer race ring being clamped to the cam 27 by a screw threaded ring 51, as shown. An oil level is preferably maintained in the housing 15 above or at least to the level of the drive pinion 41 and worm gear 39 by means of an oil cup 52, thus assuring good lubrication of bearing 50 and all of the working parts inasmuch as oil will be carried from one to another in the operation of the drill unit.

The shaft 35 is mounted in ball bearings 52 for rotation in a sleeve 53 that is slidable freely in the bore 45. A flat circular head 54 is provided on the front end of the shaft 35 and has frictional engagement around its marginal edge portion with a ring of friction material 55 mounted in an annular recess in the enlarged rear end of a hollow plug 56 that is bolted or otherwise suitably secured onto the rear end of the armature shaft 23 and projects into the bore 45. A plug 57 is threaded into the rear end of the sleeve 53 and has abutment with a spring-pressed thrust member in the form of a plunger 58 normally tending to urge the sleeve 53 forwardly so as to engage the clutch 54—55 and transmit drive to the shaft 35 from the armature shaft 23. The plunger 58 has diametrically opposed portions 59 slidably guided for movement in diametrically opposed slots 60 provided in the rear end of the sleeve 53, and one of these portions 59 has a cam-shaped projection 61 projecting radially outwardly from the periphery of the block 44 and arranged to be engaged by a dog 62 that projects radially inwardly from the cam 27, whereby to move the plunger 58 to a retracted position and automatically disengage the clutch 54—55 at the end of a cycle of feed and traverse movements and accordingly stop the cam 27. The plunger 58 has a reduced tubular stem portion 63 slidable through a hole 64 in the end wall of the cup-shaped member 48, and the coiled compression spring 65, which actuates the plunger 58, surrounds the inner end portion of the stem 63 between the main body portion of the plunger 58 and the end wall of the cup 48. Now, plug 57 has a stem 66 slidable in the tubular stem 63 to transmit pressure to the sleeve 53 to engage the clutch 54—55 independently of the plunger 58 and spring 65 when the plunger 58 is in retracted position, whereby to enable starting a new cycle of feed and traverse movements, the cam 27, once the dog 62 has moved past the cam-shaped projection 61 permitting the plunger 58 to return to its operative position, having drive transmitted thereto throughout the rest of the cycle until the dog 62 again engages the cam-shaped projection 61 at the end of the cycle. The stem 66, incidentally, serves as a means for adjusting the clutch 54—55 to compensate for wear, the outer end of the stem having flats provided thereon, as shown, to permit easily turning the same with a wrench to thread the plug 57 a fraction of a turn forward. Pressure may be applied to the outer end of the stem 66 in any suitable manner to start the cycle; I have illustrated an arm 67 pivoted at 68 on the outside of the end wall of the cup 48 and having a plunger 69 slidably mounted in a bore 70 provided therein and normally spring-pressed to its outermost position by means of a coiled compression spring 71, outward movement being limited by a bolt 72 that passes through a hole in the arm 67 and through the spring 71 and is threaded in the plunger 69, whereby to permit application of yielding pressure to the stem 66 to engage the clutch 54—55 similarly as when it is engaged by the action of the spring-pressed plunger 58. The arm 67 may be oscillated in any suitable manner to engage the clutch; I have illustrated a plunger 73 having a pin and slot pivotal connection at 74 with the free end of the arm 67, the plunger 73 forming the movable armature element of an electrical solenoid 75 that is arranged to be energized when the operator closes the switch for starting a feed cycle, or may be energized automatically by closing its electrical circuit from some other movement on a machine using the above described drill unit, as, for example, the movement of mechanism for an indexing worktable. Usually, there is also a "stop" switch in circuit with the manual "start motor" switch, and "start cycle" switch so that the operator may stop the unit whenever that is necessary, in which event, the unit will not resume operation until he presses the "start" button again. The motor 10 is otherwise preferably kept running continuously throughout the use of the drill unit, namely, between the cycles as well as throughout the cycles. The solenoid 75 is preferably enclosed by a cover 76 having a projecting hood portion 77 enclosing the upper end of the arm 67.

Referring now to Fig. 5A showing a modified or alternative construction in which an air cylinder 78 is provided integral with the plate 47' that corresponds to the plate 47 in Figs. 1 to 5, a piston 79 made in two parts so as to permit clamping cup leathers 80 therebetween for an air tight fit in the bore of the cylinder, is rigidly secured, as indicated at 81 to one end of the guide rod 11' that corresponds to the guide rod 11 in Figs. 1 to 5, whereby to impart endwise movement to the motor 10 carried on the forwardly extending shelf 16 that is rigid with the plate 47' similarly as in the other construction. Bearings 17' are provided on the plate 47' slidably mounted on guide rods 11' and 12' for slidably supporting the motor 10 and cylinder 78 for reciprocatory movement. A cap 82 closes the open end of the cylinder 78 and has a housing 83 provided thereon in which there is a tubular guide 84 for a dashpot cylinder 85 into the bore 86 of which a plunger 87 rigidly secured to the piston 79, as indicated at 88, projects for reciprocatory movement. A plug 89 threadedly adjustable in the outer end of the tubular guide 84 has a lost motion connection at its inner end with the outer end of the dashpot cylinder 85, as indicated at 90 and carries a screw threaded adjustable needle valve 91, the pointed inner end of which is arranged to enter a center port 92 in the end wall of the dashpot cylinder 85 to more or less restrict oil flow from the bore 86 into the housing 83 when the dashpot 85 is in the position shown, slots 93 being provided in the wall of the tubular guide 84 communicating with radial ports 94 in the plug 89 to afford open communication with the housing 83.

In operation, compressed air, or oil under pressure, is admitted to the outer end of the cylinder 78 through the pipe 95 to impart rapid return movement to the motor 10, the cylinder 78 under such conditions moving to the right with the plate 47', so that the plunger 87 is moved to the left in relation to the dashpot cylinder 85. The latter, by virtue of the lost motion connection 90 and the close friction fit of the plunger 87 in the bore 86 moves slightly to the left in relation to the bore of the tubular guide 84, thereby withdrawing the ported end 92 from the needle valve 91 so as to allow unrestricted flow of oil back into the bore 86, it being understood that the housing 83 is nearly filled with oil to insure complete filling of the bore 86 in the rapid return movement. When compressed air, or oil under pressure enters the other end of the cylinder 78 through a pipe 96, the motor 10 is given first a rapid approach movement followed by a slow feed movement, the fast approach occurring during the movement of the dashpot cylinder 85 to the right in relation to guide 84 to the extent of the lost motion connection 90 as plunger 87 moves to the right in relation to said guide, and the slow feed movement occurring as the oil is discharged at a more or less restricted rate through the port 92 in accordance with the adjustment of the needle valves 91. Obviously, the point at which the feed movement will commence in relation to relative movement of the piston 79 in the cylinder 78 can be predetermined by adjustment of the plug causing the feed movement to commence earlier and outward adjustment causing the feed movement to commence later in the cycle of movement. It will also be understood that the rod 11' has the same screw threaded adjusting means 31—32 on its forward threaded end 28 to permit adjusting the drill unit as a hole, similarly as in the construction of Figs. 1 to 5. The flow of compressed air, or oil under pressure to the cylinder 78 is suitably controlled by solenoid operated valves. As a matter of fact, only one such valve is necessary, if, for example, the pipe 95 has communication continuously with a source of compressed air or oil under pressure at an appreciably lower pressure than that available for pipe 96, in which event the valve controlling the inlet of compressed air or oil under pressure at an appreciably higher pressure through pipe 96 will normally be in a discharge position and be movable upon energization of the electrical solenoid, similarly as in the energization of solenoid 75 in Figs. 1 to 5, to the opposite extreme position to admit the compressed air or oil under pressure to the cylinder 78. In closing, it will also be understood that although I have shown the cylinder 78 as movable with the motor 10 relative to the piston 79, I may reverse this arrangement and provide a cylinder in fixed relation to the guide rod 11' and have a piston operated in the cylinder movable with the motor, whereby to avoid the necessity for flexible conduits connected with the pipes 95 and 96.

It is believed the foregoing description conveys a good understanding of the objects and advantages of my invention. The appended claims have been drawn to cover all legitimate modifications and adaptations.

I claim:

1. A drilling apparatus comprising in combination, a base, a pair of parallel guide rods mounted on the base, an electric motor including a casing mounted for reciprocation on said guide rods and including an armature shaft journalled therein, means for mounting a tool on one end of said armature shaft, a cam housing mounted in fixed relation to said motor casing for reciprocation therewith on said guide rods, said armature shaft having an extension on the other end thereof projecting into said cam housing, a driven shaft rotatably and slidably mounted in said cam housing in coaxial relation to the extension on said armature shaft, said armature shaft extension and said driven shaft having frictionally engageable clutch members on the adjacent ends thereof, an axially movable thrust member and a spring between the same and a part of said cam housing for yieldably urging said driven shaft in the direction normally to engage said clutch members, a hollow rotary cam drum having an endless cam track thereon rotatably mounted in said cam housing surrounding said driven shaft and having in internal drive gear thereon, a drive pinion meshing with said internal drive gear, reduction gearing for driving said pinion from said driven shaft, means mounted on said cam drum engageable with said thrust member at one point in each revolution of the cam drum for rendering the clutch engaging spring inoperative to engage the clutch at the end of a cycle of cam movement, a manually controlled shifting member mounted in said housing and movable independently of said thrust member for independently shifting said driven shaft to engage the clutch members to start a cycle of cam movement, and a stationary cam follower carried by the base in engagement with the came track on the cam drum to impart a positive feed and positive return movement to the motor and tool unit upon rotation of said cam drum through a cycle of rotation.

2. A drilling apparatus according to claim 1 in which the cam follower is mounted on one of said guide rods and including means for axially adjusting the guide rod carrying the cam follower whereby to adjust the forward limit of feed movement of the tool unit.

3. A drilling apparatus according to claim 2 in which the means for axially adjusting the guide rod carrying the cam follower comprises two adjusting nuts threaded on a portion of said guide rod on opposite sides of an abutment on the base through which said rod extends whereby to adjust the rod in either direction selectively by adjustment of said nuts.

4. In combination, an electric motor having an armature shaft journalled in the motor casing, a chuck on one end of said shaft to mount a drill or other tool, a cam housing in fixed relation to said motor adjacent the other end of said armature shaft and having an extension of said shaft projecting therein, a driven shaft rotatably and slidably mounted in said housing in coaxial relation to the armature shaft extension, said shafts having frictionally engageable clutch members on the adjacent ends thereof, an axially movable thrust member and a spring between the same and a part of said housing for yieldably urging said driven shaft in the direction normally to engage said clutch members, a hollow rotary cam drum having an endless cam track thereon rotatably mounted in said housing surrounding said driven shaft and clutch and having an internal drive gear, a drive pinion meshing with said internal drive gear, reduction gearing for driving said pinion from said driven shaft, means mounted on said cam drum engageable with said thrust member at one point in each revolution of the cam for rendering the clutch engaging spring inoperative to engage the clutch at the end of a cycle of cam movement, a manually controlled plunger movable independently of said thrust member and within the same for independently shifting said driven shaft to engage the clutch members to start a cycle of cam movement, a base on which said motor and cam housing are reciprocable as a unit, and means carried by the base in engagement with the cam to impart positive feed and positive return movement to the motor and tool unit.

5. A drilling apparatus comprising in combination, a base having longitudinal guides thereon, an electric motor including a casing mounted for reciprocation on said guides and having an armature shaft journalled therein, means for mounting a tool on one end of said armature shaft, a cam housing mounted in fixed relation to said motor casing for reciprocation as a unit therewith on said guides, said armature shaft having an extension on the other end thereof extending into said cam housing, a driven shaft journalled in said cam housing, a frictionally engageable clutch for driving said driven shaft from said armature shaft, an axially movable spring pressed thrust member within said housing for yieldably engaging said clutch, a hollow rotary cam drum having an endless cam track thereon rotatably mounted in said housing surrounding said driven shaft and clutch and having an internal drive gear thereon, a drive pinion meshing with said internal drive gear, reduction gearing for driving said pinion from said driven shaft, means mounted on sad cam drum engageable with said thrust member at one point in each revolution of the cam drum for retracting the same to disengage the clutch at the end of a cycle of cam movement, a manually controlled shifting member mounted in said cam housing and movable independently of said thrust member for engaging the clutch to start a cycle of cam movement, and a stationary cam follower carried by the base in engagement with the cam track on the cam drum to impart a positive feed and positive return movement to the motor and tool unit upon rotation of said cam drum through a cycle of rotation.

JOHN NELSON.

REFERENCES CITED

The following references are of record in the file of this patent:

UNITED STATES PATENTS

| Number | Name | Date |
|---|---|---|
| 913,312 | Sellen | Feb. 23, 1909 |
| 1,434,946 | Fiorillo | Nov. 7, 1922 |
| 1,467,752 | Ainsworth | Sept. 11, 1923 |
| 1,880,666 | Barnes et al. | Oct. 4, 1932 |
| 1,950,597 | Corwin | Mar. 13, 1934 |
| 1,998,873 | Kingsbury | Apr. 23, 1935 |
| 2,167,673 | Oberhoffken | Aug. 1, 1939 |
| 2,321,525 | Schroeder | June 8, 1943 |